Nov. 18, 1958 CARL-AXEL L. BERGMAN 2,860,456
WET TUMBLING IN ROTATING BARRELS
Filed March 13, 1956
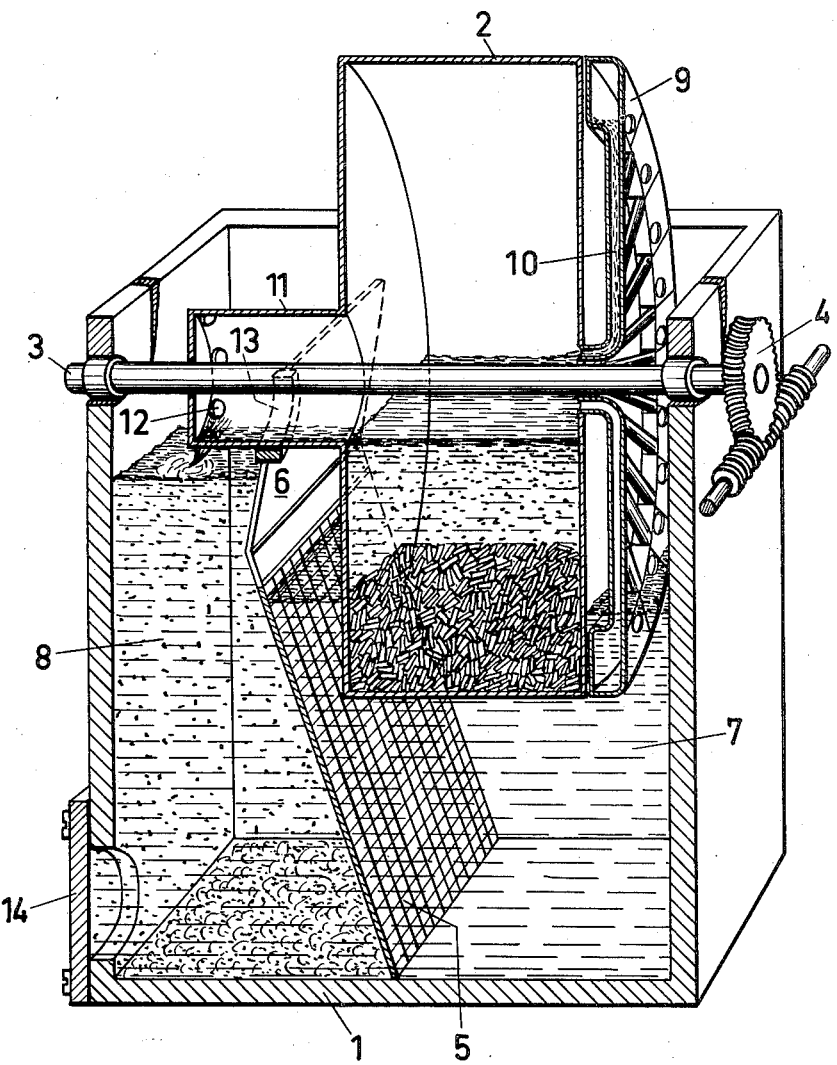
INVENTOR
Carl-Axel L. Bergman
By Darby & Darby
ATTORNEYS

United States Patent Office 2,860,456
Patented Nov. 18, 1958

2,860,456
WET TUMBLING IN ROTATING BARRELS

Carl-Axel Leopold Bergman, Atvidaberg, Sweden, assignor to Kemiska AB Candor, Stockholm, Sweden Application March 13, 1956, Serial No. 571,218

Claims priority, application Sweden March 14, 1955

4 Claims. (Cl. 51—164)

This invention relates to a device for performing wet tumbling of details in rotating barrels for example wet scouring, ball polishing, barrel nickel plating and the like, wherein the workpieces to be treated are placed in a rotating barrel in which the workpieces are acted upon by the bath as well as by abrasives included therein, and by purifying means or the like under constant motion in the rotating drum.

A disadvantage of constructions hitherto used for carrying out such wet tumbling has been that the scouring, polishing or surface treatment liquid is quickly polluted by solid particles from the scouring or the polishing, due to which the result will not always be adequate.

The object of the present invention is to eliminate this disadvantage by bringing about a continuous filtration of the tumbling liquid, the filter being so formed that sufficient capacity for collecting mud is attained. Furthermore, according to the invention the filter is easily accessible and cleaning of the plant or change of filter need not interrupt operation but for short moments, and besides, tumbling liquid is saved.

The device according to the invention is substantially characterized in that a rotating barrel is provided above a vessel which is divided into two parts by a filter, the barrel being provided with vanes, pumping devices or the like which convey liquid from one portion of the vessel to the interior of the barrel from where surplus liquid flows to the other portion of the vessel, after which the liquid flows through the filter into the first-mentioned portion of the vessel, whereafter it is again introduced into the barrel.

A particular embodiment of the invention will be hereinafter described, reference being made to the accompanying drawing which illustrates in perspective a plant in section according to the invention.

Referring now to the drawing the main part of the device comprises a vessel 1 containing the liquid included in the treatment bath. In the said vessel a barrel 2 is in a manner known caused to rotate on a shaft 3 which is driven via a worm gear 4 by a motor or the like (not shown). The vessel is divided into two sections by a filter 5 with appurtenant supporting member 6, so that two partitions 7 and 8 are formed, separated by the filter.

The barrel 2 may in a well-known manner be provided with vanes for introducing liquid into the partition 7 of the vessel, or, as will be seen from the drawing, it may be provided with collecting containers 9 which form a rim round the periphery of the barrel and have their outlets near the shaft 3 of the barrel via channels or tubes 10. The barrel 2 is provided with an outlet 11 for liquid provided with holes or the like 12 provided above the second section 8 of the vessel 1, the purpose being that all surplus liquid collected in the barrel 2 is to flow into section 8.

In certain cases the liquid surface in the second section 8 may be located above the outlet openings of the outlet tube 11, and then it is advantageous to provide in the supporting member 6 for the filter a semicircular sealing ring 13 round the cylindrical liquid outlet 11. The barrel is mounted in the usual manner in rotatable relationship to the vessel and it is mounted in such a manner that it can easily be lifted up.

When the barrel 2 is rotated by the worm gear 4, the vanes or liquid collectors 9 will take up liquid from the section 7 of the barrel. This liquid is lifted up and flows out of the containers 9 via the tubes 10 to the interior of the barrel where the treated workpieces are. The liquid in the barrel is successively polluted by mud from the workpieces and from polishing means, abrasives or the like, and the polluted liquid then flows through the liquid outlet 11 to the holes 12, where the liquid flows out and down into the second section 8 of the vessel. Here the main portion of the impurities sinks to the bottom and particles which are still floating are filtered off by the filter 5, and the liquid returning to the first section 7 of the vessel will be filtered and pure.

Due to the vibration that will always occur when the barrel 1 rotates, also the filter 5 will vibrate, whereby particles sticking to the filter will loosen and fall to the bottom. The maximum density of the filter will be a function of the difference of height which can be tolerated between the liquid surfaces of the sections 7 and 8. Thus the drum scouring or any other operation will be carried out with a constant supply of filtered water.

When the apparatus is to be cleaned the filter is covered with a board, which is pushed down into the second section 8 and covers the filter entirely, so that the liquid in the first section 7 cannot flow out. Thereafter the outlet 14 is opened through which polluted liquid flows out and the bottom can be dredged. Thus, when such a purification is carried out, all the pure (filtered) liquid in section 7 is saved and only the strongly polluted section 8 need be cleaned.

What I claim is:

1. Apparatus for carrying out wet tumbling operations such as wet scouring, ball polishing, barrel nickel plating or the like in which work pieces are acted upon by a bath as well as by the abrasives included therein, said apparatus comprising a liquid vessel, a barrel rotatably mounted above and extending at least partially into said vessel, a filter placed in said vessel to provide an approximately vertical partition separating a first portion of said vessel into which said barrel extends from the remaining portion of said vessel, a pumping device arranged to convey liquid from said first portion of said vessel to the interior of said barrel, said pumping device comprising a plurality of compartments along the periphery of said barrel with holes in each of said compartments communicating with the exterior of said barrel and conduits leading from each said compartment to the interior of said barrel at a point near the axis of said barrel, said barrel having at least one opening near the axis thereof and means for causing the liquid flowing from said opening to flow into said remaining portion of said vessel.

2. Apparatus as claimed in claim 1 wherein said filter is arranged in generally vertical position but is slanted toward the direction of flow of fluid through said filter whereby the turbulence created in said fluid and vibration of said filter causes particles to be dislodged from said filter to settle in said remaining portion of said vessel.

3. Apparatus as claimed in claim 1 wherein said means for causing liquid flowing from said opening to flow into said remaining portion of said vessel comprises an axial extension of said barrel extending across said filter and over said remaining portion of said vessel, said extension further having at least one opening to allow fluid from said barrel to flow into said remaining portion of said vessel.

4. Apparatus for carrying out wet tumbling operations such as wet scouring, ball polishing, barrel nickel plating or the like in which work pieces are acted upon by a bath as well as by the abrasives included therein, said apparatus comprising a liquid vessel, a barrel rotatably mounted above and extending at least partially into said vessel, a filter separating a first portion of said vessel into which said barrel extends from the remaining portion of said vessel, a pumping device arranged to convey liquid from said first portion of said vessel to the interior of said barrel said pumping device comprising a plurality of compartments along the periphery of said barrel with holes in each of said compartments communicating with the exterior of said barrel and conduits leading from each said compartment to the interior of said barrel at a point near the axis of said barrel, said barrel having at least one opening near the axis thereof and means for causing the liquid flowing from said opening to flow into said remaining portion of said vessel.

References Cited in the file of this patent
UNITED STATES PATENTS

| | | |
|---|---|---|
| 737,750 | Lindhard | Sept. 1, 1903 |
| 1,779,046 | McNaney | Oct. 21, 1930 |
| 2,024,310 | Sundback | Dec. 17, 1935 |
| 2,684,560 | Swanson | July 27, 1954 |